J. E. CALVERLEY AND W. E. HIGHFIELD.
APPARATUS FOR CONVERTING ALTERNATING ELECTRIC CURRENTS INTO DIRECT CURRENTS AND VICE VERSA.
APPLICATION FILED MAR. 26, 1920.
1,366,057.
Patented Jan. 18, 1921.
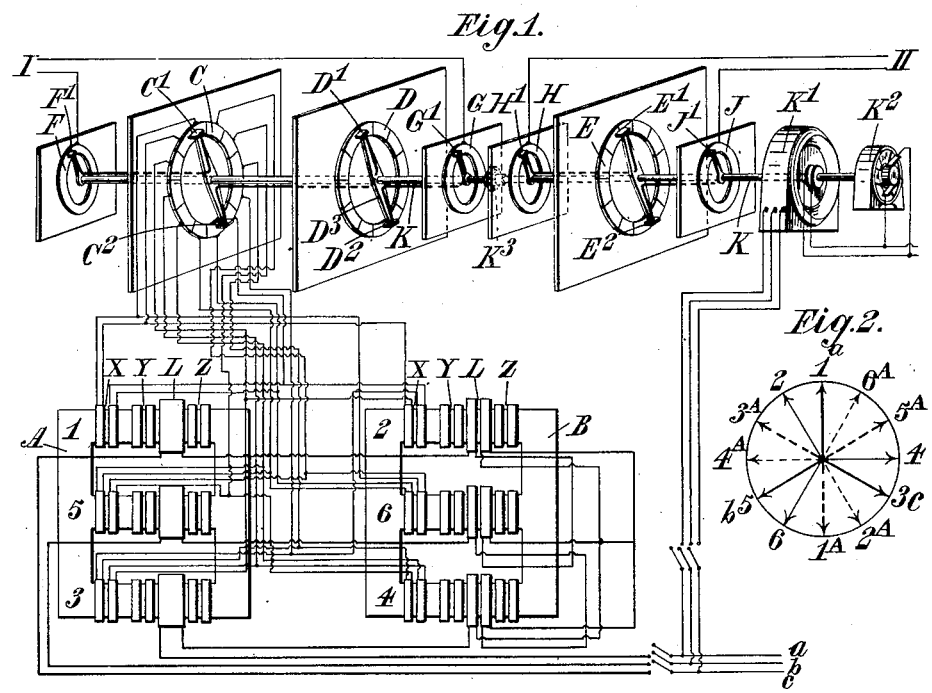
Inventors
Jno. E. Calverley
Wm E. Highfield
by Bakewell, Byrnes, Parmelee
their Attys

UNITED STATES PATENT OFFICE.

JOHN EARNSHAW CALVERLEY AND WILLIAM EDEN HIGHFIELD, OF PRESTON, ENGLAND.

APPARATUS FOR CONVERTING ALTERNATING ELECTRIC CURRENTS INTO DIRECT CURRENTS AND VICE VERSA.

1,366,057.  Specification of Letters Patent.  Patented Jan. 18, 1921.

Application filed March 26, 1920. Serial No. 369,002.

*To all whom it may concern:*

Be it known that we, JOHN EARNSHAW CALVERLEY and WILLIAM EDEN HIGHFIELD, subjects of the King of England, both residing at Preston, in Lancaster, England, have invented certain new and useful Improvements in Apparatus for Converting Alternating Electric Currents into Direct Currents and Vice Versa, of which the following is a specification.

This invention relates to apparatus for transforming alternating-current electrical energy into direct-current form and vice versa or for transforming direct-current of one voltage to direct-current of another voltage. The type of apparatus to which this invention relates is that in which one or more transformers of the ordinary alternating-current transformer type (sometimes described as "static" transformers) are employed, whereof one winding or set of windings is so interconnected as to provide a closed circuit in which the total electromotive force at any moment is zero if the winding is operating as a secondary to the transformer or transformers, and the said closed circuit is connected to commutating gear in substantially the same manner as that in which the winding of a Gramme ring armature is connected to its commutator. The object of the present invention is to render the operation of such apparatus more certain than has heretofore been the case, and in particular by imposing, or tending to impose, a definite voltage distribution in the aforesaid closed circuit.

The present invention provides, for transforming apparatus of the kind above described, and exciting winding upon the alternating-current transformer structure connected or for connection to an alternating-current supply circuit which said winding is additional to the ordinary windings of the transformer. As above stated, the object of this arrangement is to control the distribution of voltage in the closed circuit, but there is a further object, namely that, when the apparatus is to be employed for transforming from direct-current either to alternating-current or direct-current, the said additional winding and its supply enable a back electromotive force to be set up in the closed circuit, and thus be applied to the commutator and brushes prior to the switching on to the latter of the direct-current supply that is to be transformed. A heavy rush of current at the moment of switching in is thus avoided with its incidental dangers when operating at voltages of the order of 100,000 as is intended, while, further, the voltage distribution around the commutator or commutators is controlled as above indicated, at least to some extent.

A further feature of this invention is a construction in which transforming apparatus of the kind described and provided with an exciting winding in the manner just above set forth, has one set—say the primary—of the said ordinary windings of the transformer connected to one commutator or set of commutators and the other set—the secondary—of the said ordinary windings connected to another commutator or commutators, for example a commutator or set of commutators mounted on the same shaft as the first said commutator. The object of this arrangement is to provide a single operating unit whereby direct-current of one voltage applied to one of the said commutating devices is transformed to direct-current of another voltage at the second said commutating device.

This invention is now further described with reference to the accompanying drawing of which—

Figure 1 is a diagrammatic illustration of one construction of apparatus embodying this invention, and Fig. 2 is a phase diagram.

In the said construction, two three-legged three-phase transformers A and B are employed, in conjunction with commutating gear comprising three commutators C, D and E and four slip rings F, G, H and J. The commutators and slip rings are all stationary, but are provided with brushes, two brushes for each commutator and one for each slip ring, lettered respectively $C^1$, $C^2$, $D^1$, $D^2$, $E^1$, $E^2$ and $F^1$, $G^1$, $H^1$ and $J^1$. The brushes are all carried by a single driving shaft K operated by a synchronous motor indicated at $K^1$ with an exciter $K^2$.

It will be appreciated as obvious, that for correct operation it is not sufficient merely to have the brushes rotated at the correct speed, they must be truly synchronized so that each brush is situated at every moment at a point on its commutator corresponding electrically to the point to which the brushes have to be set in an ordinary direct-current machine. In other words, what may be described as nodal points of the distribution of electromotive force around the commutator revolve around the commutator, and each brush must at all times be coincident with one such node or at least must be in its immediate vicinity.

In order to secure this condition at all times, provision may be made to advance or retire the shaft angularly while it is running. This provision may, for example, take the form of means for varying the field strength of the synchronous motor driving the shaft, or of means for adjusting the stator of this motor angularly around the rotational axis of the shaft.

In the drawing, the brush arms $C^3$, $D^3$, and $E^3$ are shown all parallel with one another. In some cases, however, it may be necessary to have them arranged as though one or more were angularly displaced from such a position with relation to the remainder. Any convenient means may be employed for this purpose, such for example as an adjustable coupling as indicated diagrammatically at $K^3$. An alternative method for producing a similar result consists in so connecting the segments on a commutator to the coils of its closed circuit, that they are in advance angularly of those segments on another commutator that are connected to the corresponding coils of its own closed circuit.

The brush $F^1$ is connected to the brush $C^1$ by a connector mounted upon the shaft K, and the brushes $C^2$ to $D^1$, $D^2$ to $G^1$, $H^1$ to $E^1$ and $E^2$ to $J^1$ all by similar connectors, that is to say, connectors mounted upon the shaft K so as to revolve with it. The slip ring F and the slip ring G are connected each to one of a pair of mains I and the slip ring H and the slip ring J each to one of another pair of mains II, these mains I and II constituting direct-current connections, I being extra high tension and II being of a more ordinary, lower, voltage. If it be assumed that the apparatus is intended for converting from low tension to high, then II constitutes the direct-current supply to, and I the direct-current output circuit from, the apparatus.

Each limb of the transformers A and B carries four sets of windings lettered X, Y, L and Z respectively. Those that are lettered X are all interconnected with one another and to the segments of the commutator C, as shown upon the drawing, and so as to produce a succession of phase angles between successive commutator segments as is indicated in the phase diagram of Fig. 2. The mode of connecting the coils will be readily understood by any person skilled in the art. The windings marked Y are all connected together and to the commutator D just as are the windings X to one another and to their commutator; the windings Z being similarly interconnected and to the commutator E; the connections between the windings Y and Z and the commutators D and E are omitted from the drawing for the sake of clearness. The windings L are connected to the three mains of a three-phase alternating-current supply $a$, $b$, $c$ so as to produce in the three legs of the transformer fluxes having the succession of phase angles indicated in the diagram of Fig. 2. The relation will be clearly seen when it is pointed out that the limbs of the transformers are numbered 1 to 6 and the vectors of the diagram of Fig. 2 are similarly lettered 1 to 6, but also with the numbers $1^a$ to $6^a$, these last being employed to indicate windings that are simply reversed with relation to their correspondingly numbered fellows. Thus the winding $5^a$ is simply a winding like that numbered 5, but with its connections reversed as compared with 5. The supply $a$, $b$, $c$ is also taken to the motor $K^1$, the latter being preferably of the type which can be started as an asynchronous motor and, when having been run up to speed, can then be switched over to run as a synchronous machine.

When the apparatus is to be put into operation the motor $K^1$ is started up and when running at synchronism is switched over to run as a synchronous machine, and the circuit $a$, $b$, $c$ is then switched on to the windings L. The result of these windings being energized is to generate a voltage between each pair of segments on each of the commutators C, D and E, and, moreover, a voltage such that the successive phase relations between them is that desired and indicated by the phase diagram of Fig. 2. The direct-current supply can now be switched on to the mains II and extra high tension direct-current drawn from the outgoing mains I. Obviously the machine can be employed in the converse manner, and, when so employed, the importance of the windings L is enhanced since it will be obvious that it is important to have a back electromotive force operative at the commutators C and D prior to switching the extra high tension supply on to them.

It is to be understood that the provision of the exciting winding L is not limited according to this invention to apparatus intended to transform from direct-current at one voltage to direct-current at another voltage but is within the scope of this invention when applied, in the manner set forth in the claims, to apparatus for transforming from direct-current to alternating current or vice versa. The supply $a$, $b$, $c$, to the windings L is of course, in the case where the transformation is from direct-current to direct-current, distinct from that to the windings X, Y, Z and this may be arranged for even when the apparatus is transforming from an alternating to a direct current or vice versa.

For simplicity in the drawings, only two transformers and only twelve phase angles are shown. In practice these numbers would be considerably augmented.

What we claim as our invention and desire to secure by Letters Patent is:—

1. In electrical transforming apparatus the combination of static transforming apparatus comprising primary windings and secondary windings for transforming alternating current at one voltage to alternating current of another voltage, a third set of windings upon the static transformer structure for connection to an alternating current supply of the same frequency as that for which the said primary windings are designed and arranged to excite magnetic flux in the transforming apparatus of substantially the same magnitude and distribution as that produced by the said primary windings, circuits connecting the said secondary set of windings to constitute a closed circuit in which the total electromotive force at every moment is zero, a commutator and brushes therefor, tappings from successive points on the said closed circuit, means connecting the said tappings to successive segments of the commutator and means for producing relative rotation between the commutator and its brushes substantially as and for the purpose set forth.

2. In electrical transforming apparatus the combination of static transforming apparatus comprising primary windings and secondary windings for transforming alternating current at one voltage to alternating current at another voltage, a third set of windings upon the static transformer structure for connection to an alternating current supply of the same frequency as that for which the said primary windings are designed and arranged to excite magnetic flux in the transforming apparatus of substantially the same magnitude and distribution as that produced by the said primary windings, circuits connecting the said secondary set of windings to constitute a closed circuit in which the total electromotive force at every moment is zero, circuits connecting the said primary set of windings to constitute a second closed circuit in which the total electromotive force at every moment is zero, a plurality of commutators and brushes therefor arranged to constitute two electrically distinct sets of commutating gear, tappings from successive points of each of the said two closed circuits, means connecting the tappings from the first said closed circuit to one said set of commutating gear, means connecting the tappings from the said second closed circuit to the other set of commutating gear and means for producing relative rotation between the commutators and their brushes substantially as and for the purpose set forth.

3. In electrical transforming apparatus the combination of two sets of three-phase static transformers an exciting winding upon each limb of each transformer of one set, two exciting windings upon each limb of each transformer of the second set, means for so connecting the exciting windings on the first said set that each winding is excited by one phase only of the said supply, means for connecting the exciting windings of the second set so that the two windings on any one limb are excited by two at least of the phases of the said supply, two distinct sets of commutating gear, means for connecting the primaries of both sets of transformers into at least one closed circuit in each of which the total electromotive force at every moment is zero, means connecting tappings on each such closed circuit to one commutator of the said commutating gear, means for connecting the secondaries of both sets to form at least one closed circuit in which the total electromotive force at every moment is zero and means connecting each such closed circuit to a commutator of the second set of commutating gear, and means for revolving the brushes of all the commutators relatively to the commutators substantially as and for the purpose set forth.

In testimony whereof we have signed our names to this specification in the presence of two subscribing witnesses.

JOHN EARNSHAW CALVERLEY.
    WILLIAM EDEN HIGHFIELD.

Witnesses:
 ERNALD S. MOSELEY,
 JOHN M. THOMAS.